(12) United States Patent
Jefferson

(10) Patent No.: US 6,901,793 B1
(45) Date of Patent: Jun. 7, 2005

(54) HIGH TEMPERATURE PILOT PROBE COVER

(76) Inventor: Ernest T. Jefferson, P.O. Box 215, Belhaven, NC (US) 27810

( * ) Notice: Subject to any disclaimer, the term of this patent is extended or adjusted under 35 U.S.C. 154(b) by 21 days.

(21) Appl. No.: 10/661,427

(22) Filed: Sep. 15, 2003

(51) Int. Cl.⁷ .............................................. G01C 21/00
(52) U.S. Cl. ........................ 73/182; 244/1 R; 150/154
(58) Field of Search ............................. 73/182, 861.65, 73/861.66; 244/1 R, 121, 316; 150/154, 150/166

(56) References Cited

U.S. PATENT DOCUMENTS

| | | | |
|---|---|---|---|
| 5,127,265 A | * | 7/1992 | Williamson et al. .......... 73/182 |
| 6,412,343 B1 | * | 7/2002 | Jefferson ..................... 73/182 |
| 6,612,521 B1 | * | 9/2003 | DeGroff ..................... 244/1 R |

\* cited by examiner

*Primary Examiner*—Harshad Patel
(74) *Attorney, Agent, or Firm*—Mills Law Firm PLLC

(57) ABSTRACT

A cover for a pitot-static probe includes a braided head resistance sleeve insertable over the probe that has an open end provided with an annular fold carrying a retaining ring for establishing a compressive fit with a non-tapered portion of the probe and accommodating relative movements of the sleeve in response to ground conditions without dislodging.

8 Claims, 4 Drawing Sheets

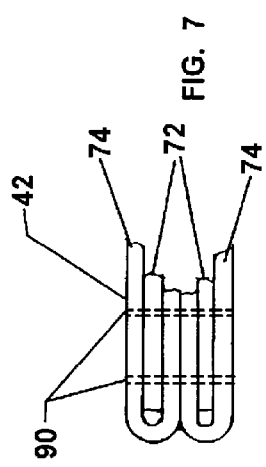
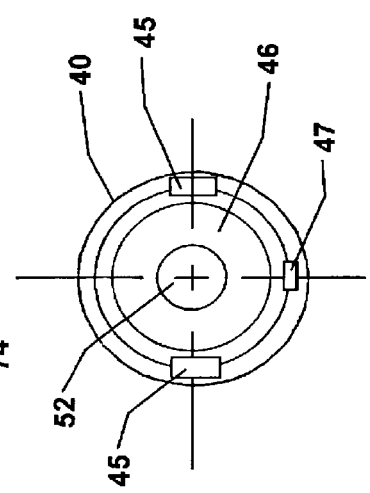
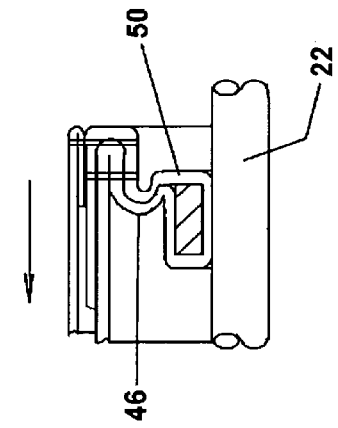
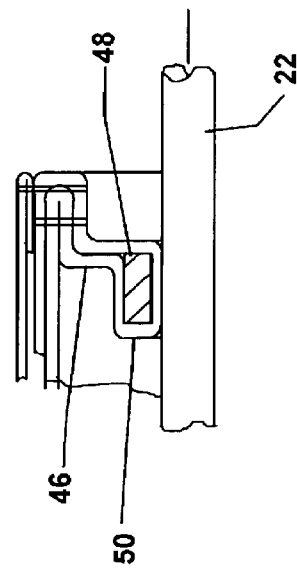
FIG. 6
FIG. 7
FIG. 8
FIG. 9

HIGH TEMPERATURE PILOT PROBE COVER

FIELD OF THE INVENTION

The present invention relates to the protection of pitot tubes and, in particular, an improved retention probe cover for constant diameter aircraft pitot probes.

BACKGROUND OF THE INVENTION

Pitot static tubes are conventionally used on aircraft for measuring speed and altitude. Because of sensitivity and delicacy, such instruments are particularly prone to damage during installation, maintenance, and storage. To avoid such contamination, for any appreciable layover, the pitot static tubes are covered temporarily to prevent dust, particulates and other foreign matter from entering the probe ports. Prior to flight, the probe covers are removed.

Many aircraft, primarily commercial, also employ heating devices on the pitot static probes to prevent icing at the probe ports that can adversely affect the accuracy thereof and fire resistant materials have been developed as disclosed in U.S. Pat. No. 5,127,265 to Williamson et al. Therein, the body of the pitot static tube cover is a braided material comprised of fiberglass material that is pretreated to remove sizing and organic residue. Such design is currently in commercial usage and does provide protection against thermal degradation in the presence of inadvertent thermal cycles. Poly-aramids are also used as disclosed in my prior patent, U.S. Pat. No. 6,412,343.

While the foregoing provide effective protection, changes in pitot tube design for some aircraft pose particular difficulties in maintaining effective mounting during ground servicing constant diameter probes such as used on A300 Airbus and 757 Boeing aircraft pose a particular problem. These probes cannot use the Pitot tube tapers to assist installation and retention. Inasmuch as the interface is the fabric, the diametral control of the cover mouth has been effected by a reinforcing ring. In certain approaches, non-elastic bands have been used. The lack of flexibility limits the interference fit at the mouth cover installation that can be achieved without abrading the cover fabric. The resulting low retention force makes the cover subject to incremental movement in the presence of intermittent wind gusts and physical contact during service. Coiled springs have also been used to provide the interface biasing. Particularly in constant diameter probes without tapered entry tips, significant abrasion can occur. Moreover, there is a trend for removing any metallic content from the proximity of the engine intakes providing a need to provide a totally non-metallic cover design.

SUMMARY OF THE INVENTION

The present invention provides an improved fabric pitot static probe cover having a flexibly mounted retaining ring that securely compressively engages non-tapered pitot tubes and resists conditions tending to dislodge the cover. The probe cover comprises a single length of woven heat resistant tubing that includes a sleeve body for receiving the probe tip, a sealed tail section and a non-metallic, constant diameter retaining ring connected to the sleeve by a flexible annulus that allows limited translation of the sleeve without generating removal forces. Extreme removal forces lift the front section of the retaining ring causing a camming effect on the rear of the retaining ring that increases the break away force to effectively eliminate inadvertent removal. Resultantly, sufficient forces are generated for withstanding extreme ground conditions while providing a low level normal biasing that allows removal with conventional removal tools without excess effort. Further, for installation, the retaining ring locally expands to allow insertion over the blunt end of the probe without fabric abrasion. Moreover, the cover and retaining ring are formed entirely on non-metallic material limiting problems should the cover be ingested by the aircraft engines.

Accordingly, it is an object of the present invention to provide a pitot probe cover for use with constant diameter pitot tubes that has increased resistance to inadvertent removal forces.

Another object of the invention is to provide a flexible pitot probe cover having a flexibly mounted retaining ring that accommodates normal aircraft servicing operation without inadvertently dislodging.

A further object of the invention is to provide a pitot tube cover for non-tapered pitot tubes having controlled compressive fitting with the pitot tube body for extended periods.

Yet another object is to provide a pitot tube cover formed entirely on non-magnetic materials.

DESCRIPTION OF THE DRAWINGS

The above and other objects and advantages of the present invention will become apparent upon reading the following detailed description taken in conjunction with the accompanying drawings in which:

FIG. 6 is a front end view of the probe cover mounted on the pitot tube;

FIG. 7 is a fragmentary cross sectional view of the tail section of the probe cover taken along line 7—7 of FIG. 1;

FIG. 8 is a fragmentary cross sectional view of the head section of the probe cover showing the axially shiftable retaining ring in the installed position on the constant diameter section of the pitot tube; and FIG. 9 is a fragmentary cross section view similar to FIG. 8 showing the retaining ring in an axially shifted position.

DETAILED DESCRIPTION OF THE PREFERRED EMBODIMENT

Figure 1:
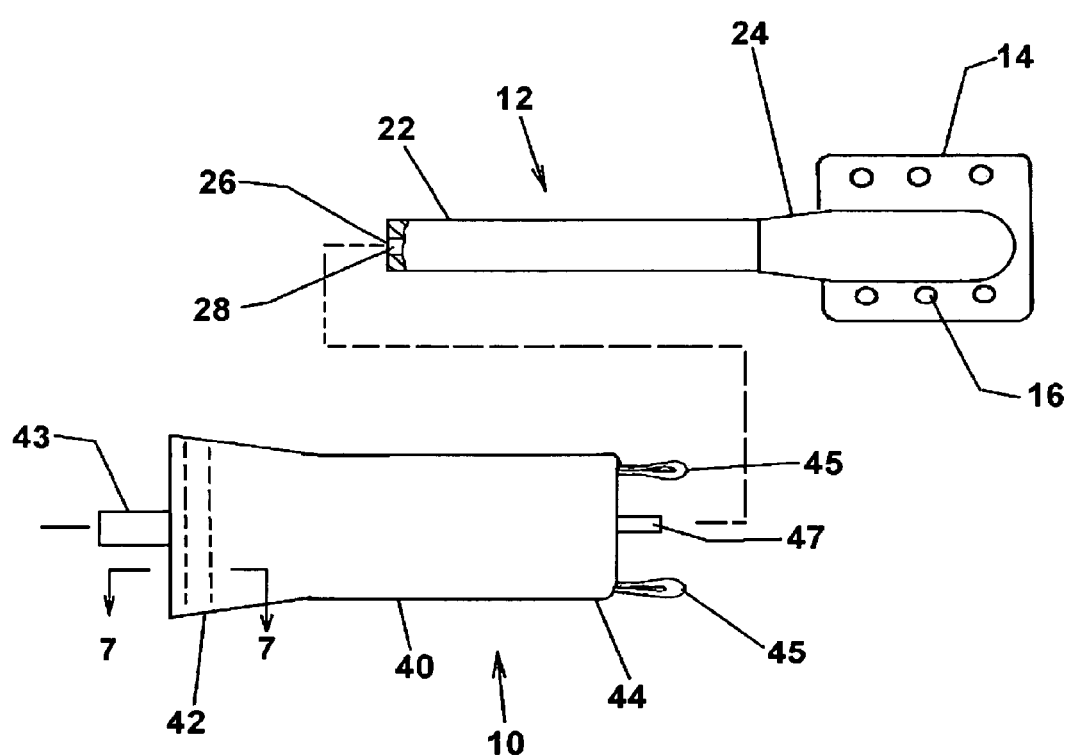
FIG. 1 is a side elevational view of an aircraft pitot tube and a probe cover in accordance with an embodiment of the invention.
Figure 2:
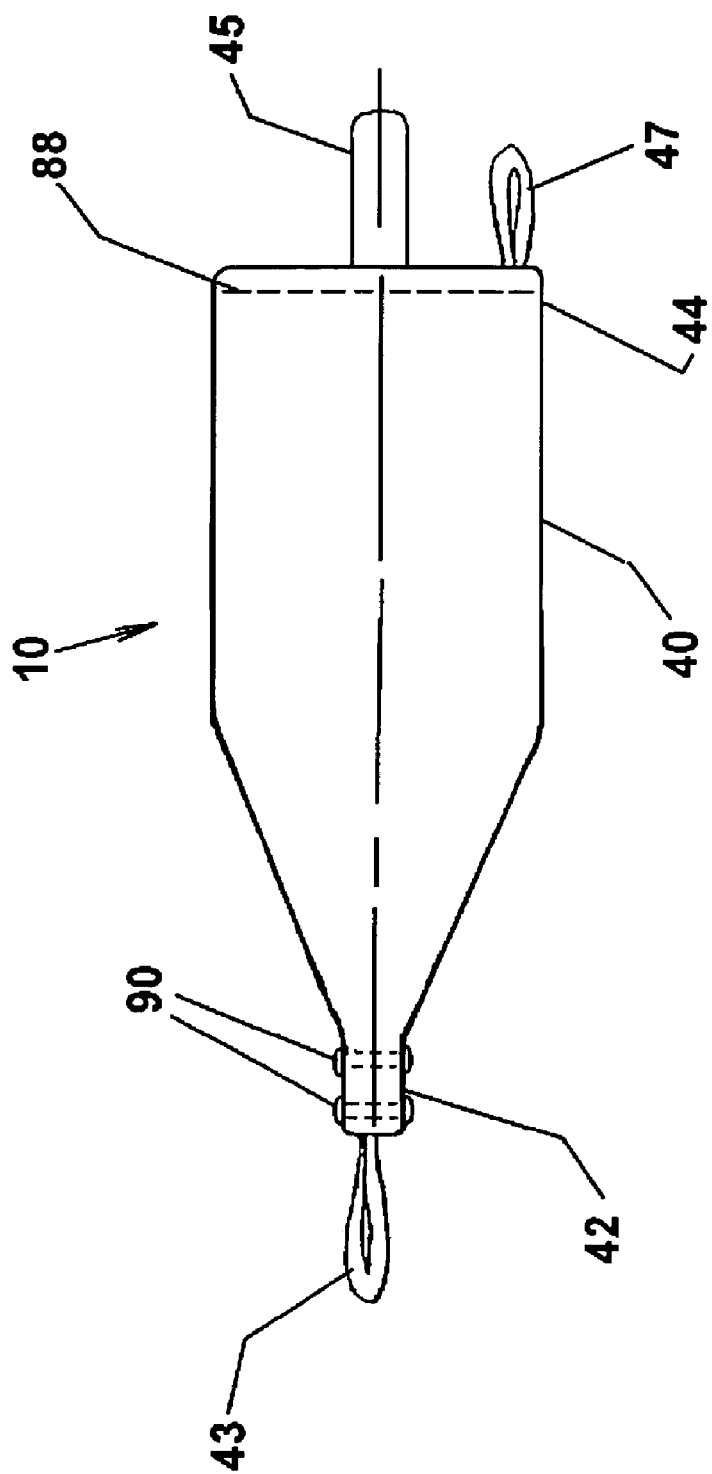
FIG. 2 is a top view of the probe cover of FIG. 1.

Referring to the drawings for the purpose of describing the preferred embodiments only and not for limiting same, FIGS. 1 and 2 show a high temperature pitot static probe cover 10 adapted to be slidably disposed over the forwardly projecting distal end of a pitot static tube 12. The static tube 12 includes a base 14 provided with apertures 16 for conventional mounting with fasteners on the nose of an aircraft, not shown.

The main body 20 of the probe 12 comprises a blunt ended constant diameter cylindrical probe 22 rearwardly merging with a conically tapered rear section 24. The probe 22 includes a ram pressure port 26 at the entrance for the internal passage 28 in the probe. The probe 12 is provided heating elements, not shown, for preventing ice formation thereon or therein.

The constant diameter of the middle section of the probe is typical of designs used on various large jet aircraft, particularly the Boeing 757 series and the Airbus 400 series. Because of the difficulty of providing a sufficient biasing, conventional covers have been difficult to retain on the aircraft during servicing.

The probe cover 10 in accordance with the present invention is provided with a floating compressive interface that resists inadvertent removal in service. The cover 10 of the present invention has an installed length at least sufficient to cover the probe 12 from the entrance tip 26 to the middle to rear portion of the probe, generally about 3-½ in for the Airbus probes. The cover 10 is formed of a single length of woven fiber tubing having an annular mouth at the head section for receiving the probe into the interior and a closed tail section. The cover 10 is a braided tube of continuous length fibers providing high strength and abrasion resistance and elevated temperature stability. As discussed in greater detail below, the cover material may be a glass fiber reinforced material as disclosed in the above-discussed patents. For the present application, a non-glass para-aramid fiber is preferred.

Figure 5:
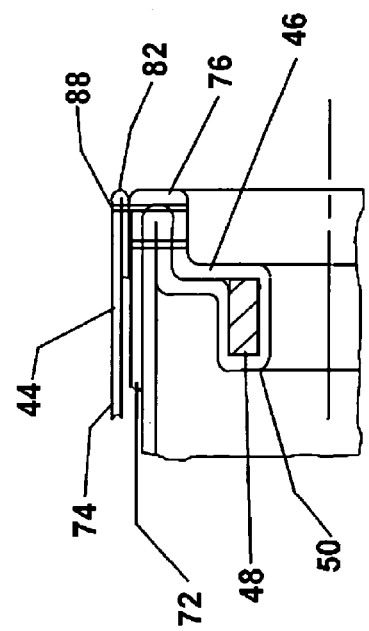
FIG. 5 is a sectioned side view of the probe cover at the completed manufacturing stage.

Referring additionally to FIG. 2, the cover comprises a sleeve body 40 having a closed tail section 42 including a removal loop 43 and an open head section 44 including side lifting loops 45 and bottom tag loop 47. As shown in FIG. 5, the head section 44 includes an inwardly depending multiple ply folds forming a multiple ply annular web 46. The web 46 terminates with a folded pocket carrying a circular band 48 forming an annular retaining ring 50. Referring to FIG. 6, the retaining ring 50 includes a cylindrical passage 52 having a sliding interference fit with the center section 24 of the probe. The web 46 allows the sleeve body 40 to axially shift without applying a removal force on the retaining ring 50, permitting the cover to resist otherwise inadvertent contact occurring during ground service.

The web that allows relative movement, without slippage, of the retaining ring 50 from the normal installed position of FIG. 8 to the extended position of FIG. 9. Upon further movement of the sleeve body 40 in the direction of the arrows, the web 46 is folded thereby applying an upwardly directed force at the front of the retaining ring 50, torquing the ring and increasing the compressive engagement at the rear thereof thereby increasing the breakaway force for probe cover removal. The increase is sufficient to compensate for interface dimensional variations, temperature conditions and the like, but not as to significantly affect the ultimate removal force required.

The band 48 is a cylindrical ring formed of a temperature resistant silicone rubber that may include appropriate fillers for temperature resistance and strength. Alternatively, the band may comprise a non-elastic wrapped band of braided cord as described in the above U.S. Pat. No. 6,412,343 to Jefferson.

Figure 3:
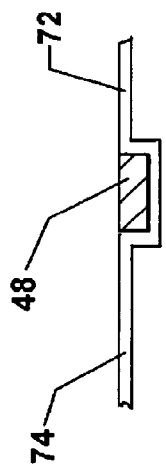
FIG. 3 is a partially sectioned side view of the probe cover at an initial manufacturing stage.
Figure 4:
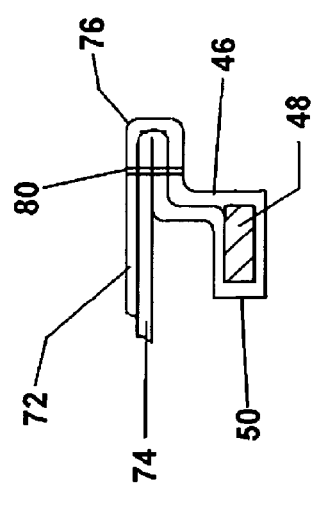
FIG. 4 is a partially sectioned side view of the probe cover at an intermediate manufacturing stage.

Referring to FIGS. 3 through 5, the band 48 is inserted over a single length tube of braded tubular fabric. The length of the fabric and the position of the band thereon are dependent on the dimension relationship desired for a particular probe cover design, and will vary in accordance with the probe specifications. A further preferred material for the tube cover is braided continuous filament yarn para-aramid organic fibers, particularly including Kevlar brand fibers and Nomex brand fibers, both available from E.I. DuPont de Nemours and Company. Such fibers do not require annealing or pretreatment prior to assembly. Further, such fibers have tenacity, modulus, break elongation, and tensile strength properties comparable to glass yarns as well as satisfactory decomposition temperatures for the probe environment. Further, these para-aramid fibers are resistant to abrasive conditions in the field.

For assembly as shown in FIG. 3, the band 48 is inserted over the fabric tube. The fabric is stretched or formed to remove any creases and provide a surface conforming to the inner diameter of the band 48. For reference, the band 48 separates the tube into a front section 72 and a rear section 74.

Referring to FIG. 4, thereafter the inner end of the rear section 74 adjacent the band 48 is telescoped over the band and therebeyond to establish a folded frontal rim 76. Next, the front section is inverted and telescoped of the rim 76 and over the remainder of the rear section, terminating at a location proximate the final tail section location. As a result of the above folding, the nominal diameter of the tube in the area of the rim is reduced. Next, the rim 76 is manually or mechanically enlarged to selected diameter. A circumferential chain stitch 80 is applied at the rear of the rim 76 thereby capturing the band in the pocket and establishing the flexible web.

Thereafter, as shown in FIG. 5, the end portion of the rear section 74 is inverted and telescoped over the front section 72. The end is reversely folded to establish a frontal hem 82 overlying the rim 76. The free ends of the loops 45, 47 are positioned between the hem 82 and the rim 70 and a circumferential stitch 88 is established to secure the loops in place and the hem to the rim. Thereafter, as shown in FIG. 7, the tail section 42 is pressed flat, the ends of removal loop 43 inserted between the folds and transverse stitches 90 applied to finalize the assembly and closed the end of the tube.

The flexible web 46 between the ring pocket and the stitches 90 allows the probe cover to float with respect to the retaining ring 50 as indicated by the arrow in FIG. 9, allowing limited movement without breaking the compressive retention forces. Upon a further direct removal, the front of the band 48 is biases outwardly thereby applying a torque to the ring creating a camming effect at the rear that further increases the retention forces. Tests have indicated that a dead load in excess of 5 pounds applied to the removal loop on a vertically disposed probe are resisted by the present invention, more than sufficient to prevent inadvertent dislodging of the sleeve during ground servicing.

While the present embodiment has been described with reference to the preferred embodiments, other modifications and changes thereto will become apparent. Accordingly, the invention is to be interpreted solely with reference to the following claims.

What is claimed:

1. A cover for a pitot-static probe having a non-tapered probe section, said cover comprising: a braided poly-aramid fibers tubular body formed to provide a closed tail section and an open head section, said head section including an inwardly extending annular fold defining a retaining pocket; a cylindrical silicone rubber ring carried in said pocket and forming an inner end of said pocket into a cylindrical passage having an interference fit with said non-tapered probed section, said annular fold having an unsupported length and flexibility sufficient to allow said tubular body to axially shift relative to said pocket without overcoming said interference fit.

2. A cover for a pitot-static probe comprising: a probe cover body formed of a single length of braided heat resistant tubing forming a sleeve having a closed end and an open end, said open end having an integral inwardly depending fold forming a flexible annulus terminating with an annular pocket; an annular member in said pocket engaging said pocket to establish a diameter providing a compressive fit in assembly with said probe.

3. The probe cover as recited in claim 2 wherein said annular member is a cylindrical ring formed of an elastomeric material.

4. The probe cover as recited in claim 3 wherein said annular member is formed of a silicone rubber.

5. The probe cover as recited in claim 2 wherein said annulus is secured by stitching at an outer end to said tubing and wherein said annulus has sufficient length to permit said sleeve to telescope with respect to said pocket without overcoming said compressive fit.

6. The probe cover as recited in claim 5 wherein said sleeve has a first ply extending from said head section to said second section overlaid on interior and outer surfaces by a second ply, the inner portion of said second ply adjacent said head section being folded to form said pocket of said annulus.

7. The probe cover as recited in claim 6 wherein the end of said first ply is retained between said second ply at said tail section thereby preventing frayed ends thereof interior of the cover.

8. The probe, cover as recited in claim 7 wherein the end of said first ply is reversely formed to a circumferential hem at said head section thereby preventing frayed ends thereof interior of the cover.

* * * * *

UNITED STATES PATENT AND TRADEMARK OFFICE
CERTIFICATE OF CORRECTION

PATENT NO. : 6,901,793 B1
DATED : June 7, 2005
INVENTOR(S) : Ernest T. Jefferson It is certified that error appears in the above-identified patent and that said Letters Patent is hereby corrected as shown below:

<u>Title page, Item [54] and Column 1, line 1,</u>
Title change, "HIGH TEMPERATURE - P I L O T - PROBE COVER" to -- HIGH TEMPERATURE PITOT PROBE COVER --.

Signed and Sealed this

Sixteenth Day of August, 2005

JON W. DUDAS
*Director of the United States Patent and Trademark Office*